(12) United States Patent
Frank

(10) Patent No.: US 8,047,956 B2
(45) Date of Patent: Nov. 1, 2011

(54) BICYCLE MULTI-SPEED HUB

(75) Inventor: Wolfram Frank, Bamberg (DE)

(73) Assignee: SRAM Deutschland GmbH (DE)

( * ) Notice: Subject to any disclaimer, the term of this patent is extended or adjusted under 35 U.S.C. 154(b) by 898 days.

(21) Appl. No.: 12/050,090

(22) Filed: Mar. 17, 2008

(65) Prior Publication Data

US 2008/0224530 A1   Sep. 18, 2008

(30) Foreign Application Priority Data

Mar. 15, 2007   (DE) .......................... 10 2007 012 535

(51) Int. Cl.
*F16H 3/44* (2006.01)
(52) U.S. Cl. ....................................................... 475/297
(58) Field of Classification Search ................... 475/297
See application file for complete search history.

(56) References Cited

U.S. PATENT DOCUMENTS

| 5,667,233 A | 9/1997 | Metzinger |
| 5,967,937 A * | 10/1999 | Matsuo .......................... 475/297 |
| 2005/0197230 A1 * | 9/2005 | Steuer et al. .................. 475/296 |

FOREIGN PATENT DOCUMENTS

DE   198 15 940 A1   10/1999

* cited by examiner

*Primary Examiner* — Edwin A Young
(74) *Attorney, Agent, or Firm* — Milan Milosevic; Lisa Serdynski; Steven Courtright

(57) ABSTRACT

A multi-speed hub for cantilever mounting to a bicycle frame generally includes a planetary gear mechanism, a hub shaft, a hub shell, a spoke shell, a driver and a driven gear. The hub shell is cantilever-mounted to the bicycle frame and configured to enclose the planetary gear mechanism and the hub shaft. The spoke shell, driver and driven gear are rotatably supported by the hub shell. One end of the hub shaft is indirectly supported by the hub shell and the other end of the hub shaft is fixed to the bicycle frame.

20 Claims, 3 Drawing Sheets

BICYCLE MULTI-SPEED HUB

BACKGROUND OF THE INVENTION

The present invention relates to bicycle multi-speed hubs, and more particularly, to a multi-speed hub for cantilever mounting to a bicycle frame.

A multi-speed hub cantilever-mounted to a bicycle frame is disclosed in German patent DE 198 15 940 A1. The multi-speed hub includes a hub shaft having a reinforced conical end for cantilever mounting of the hub shaft to the bicycle frame. A spoke shell encloses a hub shell rotatable therewith, a splined profile transferring torque therebetween.

SUMMARY OF THE INVENTION

The present invention provides a multi-speed hub generally including a planetary gear mechanism, a hub shaft, a hub shell, a spoke shell, a driver and a driven gear. The planetary gear mechanism provides a plurality of transmission paths. The hub shell is configured to enclose the planetary gear mechanism and the hub shaft. The hub shell is cantilevered-mounted to the bicycle frame. The spoke shell, driver and the driven gear are rotatably supported by the hub shell. One end of the hub shaft is indirectly supported on the hub shell and the other end of the hub shaft is fixed to the bicycle frame. So configured, the planetary gear mechanism and the hub shaft are spared bending loading originating from the bicycle wheel.

In one embodiment of the present invention, the driven gear transfers torque from the planetary gear mechanism to the spoke shell. The driven gear is rotatable relative to the hub shell and the hub shaft. The driver, the driven gear and the spoke shell are axially retained along the hub shell by an end cover. Bearings disposed between the hub shell and the hub shaft are positioned on the hub shaft by a bearing cone. One end of the hub shaft is enclosed by the end cover and the other end of the hub shaft is enclosed by the bicycle frame. The end cover axially positions the spoke shell against the driven gear. The spoke shell includes a brake mounting flange for receiving a brake device and a plurality of spoke mounting flanges each having at least one spoke opening for receiving a spoke. The brake device may be a brake disc or a brake drum. The hub shell includes bearing seats for receiving roller bearings and a fastening flange for cantilever-mounting the hub shell to the bicycle frame. The bearing seats and the fastening flange may be disposed on an outer contour of the hub shell. The spoke shell is configured to supportively receive the roller bearings such that when the spoke shell is removed from the hub shell, the roller bearings remain on the spoke shell. The driven gear includes an inner contour for engaging a ratchet mechanism and an outer contour for engaging a driven contour of the spoke shell to transfer torque.

These and other features and advantages of the present invention will be more fully understood from the following description of one or more embodiments of the invention, taken together with the accompanying drawings.

DETAILED DESCRIPTION

Figure 1:
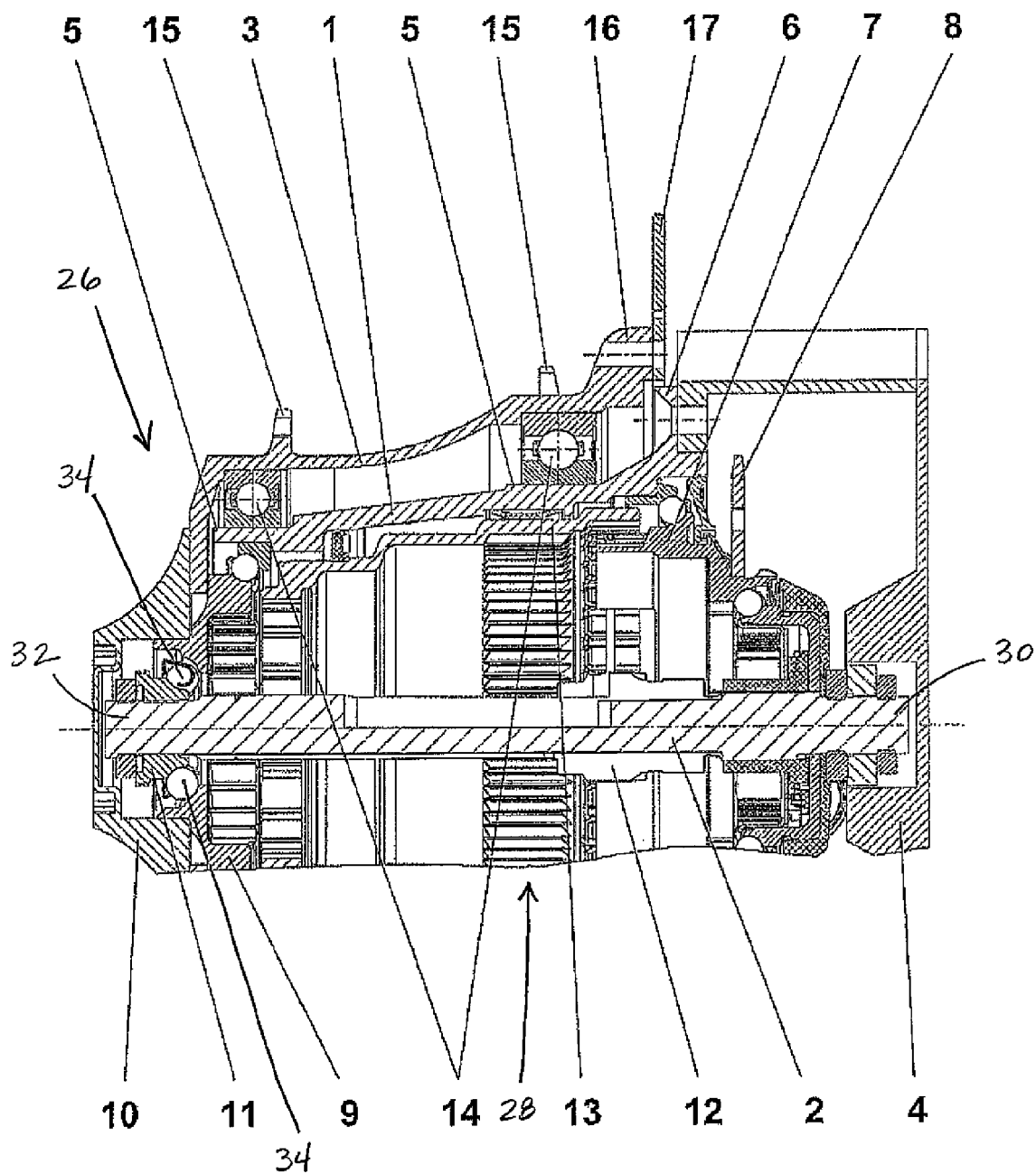
FIG. 1 is a partial cross-sectional view of a multi-speed hub according to one embodiment of the present invention.
Figure 2:
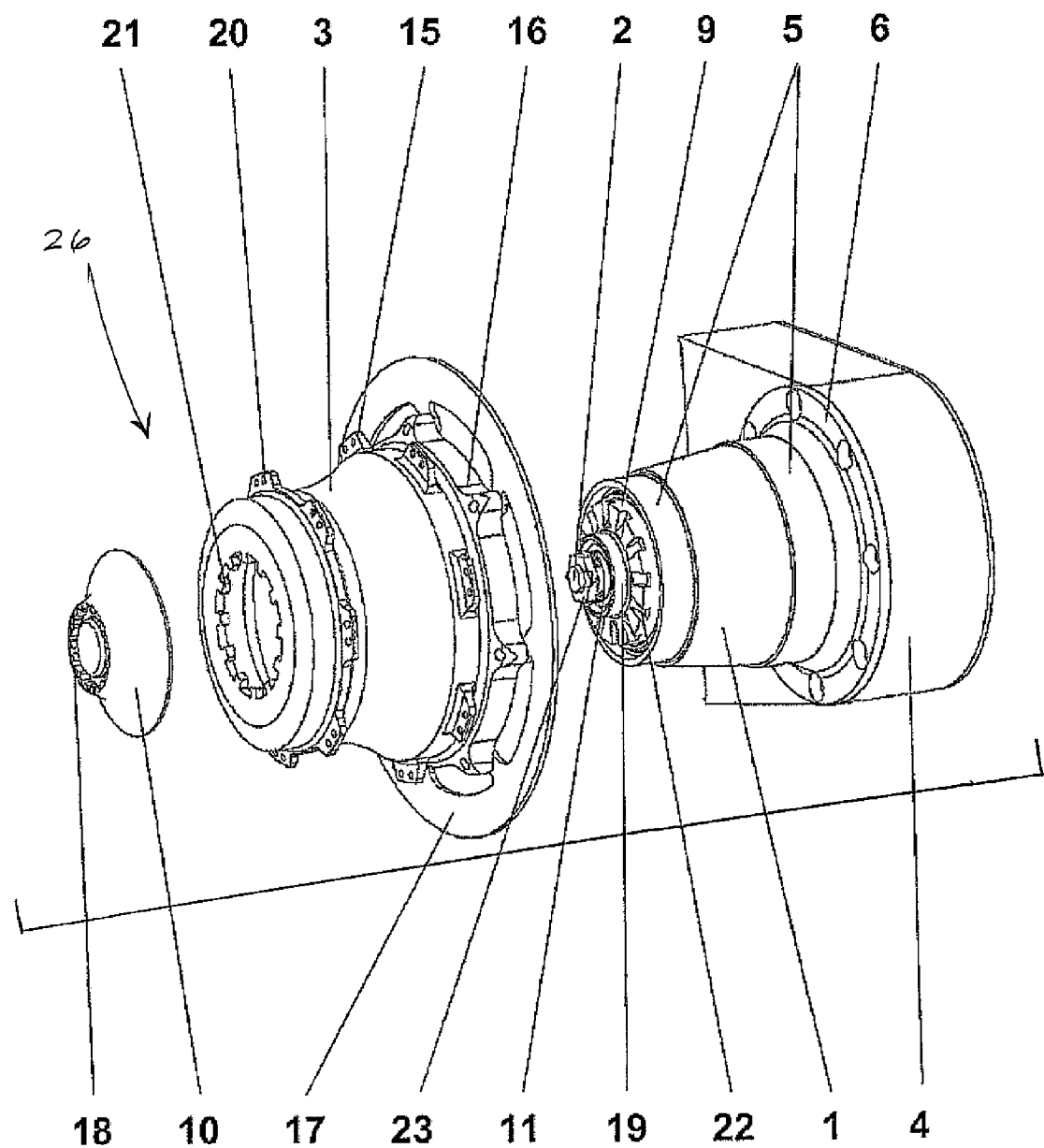
FIG. 2 is a partially exploded perspective view showing an end cover and a spoke shell removed from a hub shell of the multi-speed hub of FIG. 1.
Figure 3:
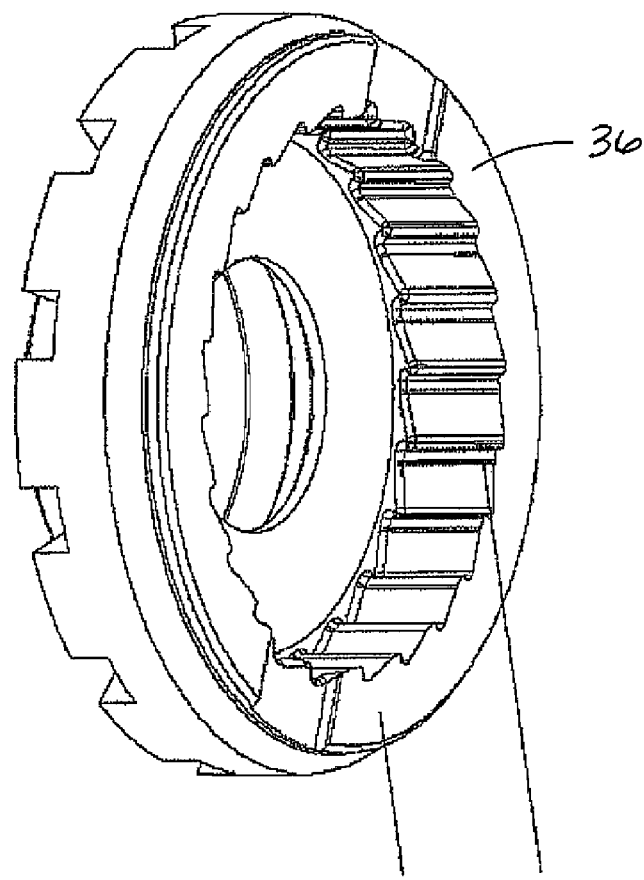
FIGS. 3 and 4 are inboard and outboard perspective views of a driven gear in the multi-speed hub of FIG. 1.
Figure 4:
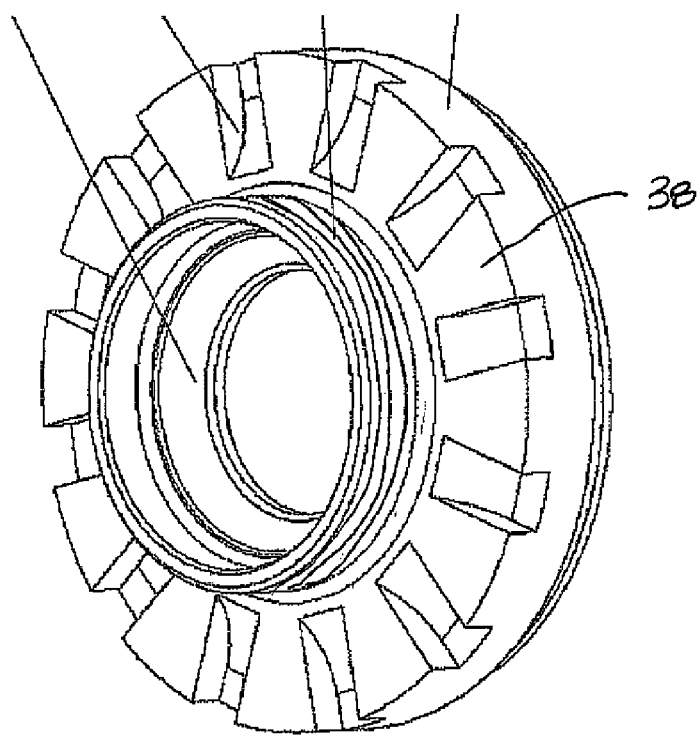

FIGS. 1-4 illustrate a multi-speed hub 26 cantilever mounted to a bicycle frame 4 according to one embodiment of the present invention. The multi-speed hub 26 generally includes a planetary gear mechanism 28, a hub shaft 2, a hub shell 1, a spoke shell 3, a driver 7 and a driven gear 9. The hub shell 1 includes two bearing seats 5 and a fastening flange 6 disposed on an outer contour of the hub shell 1. The fastening flange 6 is mounted to the bicycle frame 4 by a fastening element such as a screw or bolt. Alternatively, the hub shell 1 and the bicycle frame 4 may be connected through a threaded connection or the like.

The hub shaft 2 has first and second ends 30, 32. The first end 30 is fixed to the bicycle frame 4. Additionally, the first end 30 of the hub shaft 2 is supported by the driver 7 and the second end 32 of the hub shaft 2 is supported by the driven gear 9, therefore also indirectly supported by the hub shell 1. The first end 30 is covered by the frame part 4 and the second end 32 is covered by an end cover 10. The driver 7, driven gear 9 and the spoke shell 3 are axially retained along the hub shell 1 by the end cover 10. The end cover 10 includes a tool contour 18 and is threaded onto a fastening thread 19 on the driven gear 9. Bearings 34 are disposed between the hub shell 1 and the hub shaft 2 and are axially positioned along the hub shaft 2 by a bearing cone 11 threaded onto the hub shaft 2. The position of the bearing cone 11 is fixed by a locknut 23.

The driven gear 9 is mounted on the hub shell 1 and supports the second end 32 of the hub shaft 2. Looking to FIGS. 3 and 4, the driven gear 9 includes first and second sides 36, 38. The first side 36 includes an inner contour 24, in this embodiment radially inner contour 24, that engages with a ratchet mechanism of the planetary gear mechanism 28 for transferring torque from the planetary gear mechanism 28 to the driven gear 9. The second side 38 of the driven gear 9 includes an outer contour 22 that engages a driven contour 21 of the spoke shell 3 for transferring torque to the spoke shell 3. The fastening thread 19 and a bearing race 25 for the bearings 34 of the bearing cone 11 are also disposed on the second side 38 of the driven gear 9.

The spoke shell 3 is supported on the bearing seats 5 of the hub shell 1 with two roller bearings 14. The spoke shell 3 includes a plurality of spoke mounting flanges 15 and a brake mounting flange 16 for a brake device, in this embodiment a brake disc 17. The spoke mounting flanges 15 include two spoke openings 20. The spoke shell 3 and the driven gear 9 may be removed from the hub shell 1 by unthreading the end cover 10 from the driven gear 9. The spoke shell 3 is configured to supportively receive the roller bearings 14 such that when the spoke shell 3 is removed from the hub shell 1, the roller bearings 14 remain on the spoke shell 3. The spoke shell 3 includes the driven contour 21 that engages the outer contour 22 of the driven gear 9. In lieu of spokes, the spoke shell 3 may also be connected to the bicycle rim by discs or may form a single part with the bicycle rim.

Looking to FIG. 1, several components of the planetary gear mechanism 28 are shown. A sun gear 12 is disposed on the hub shaft 2 and an internal gear 13 is disposed within the hub shell 1. A drive chain (not shown) engages a sprocket 8 connected to the driver 7. The input drive force of the chain is transferred through the sprocket 8 to the driver 7 and then introduced into the planetary gear mechanism 28. The output torque of the planetary gear mechanism 28 is transferred from the driven gear 9 to the spoke shell 3.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A multi-speed hub for cantilever mounting to a bicycle frame, the multi-speed hub comprising:
   a planetary gear mechanism providing a plurality of transmission paths;
   a hub shaft fixed to the bicycle frame;
   a hub shell configured to enclose the planetary gear mechanism and the hub shaft, the hub shell cantilever-mounted to the bicycle frame; and
   a spoke shell, a driver and a driven gear rotatably supported by the hub shell,
   one end of the hub shaft indirectly supported by the hub shell and the other end of the hub shaft fixed to the bicycle frame.

2. The multi-speed hub of claim 1, wherein the driven gear transfers torque from the planetary gear mechanism to the spoke shell, the driven gear rotatable relative to the hub shell and the hub shaft.

3. The multi-speed hub of claim 2, wherein the driver, the driven gear and the spoke shell are axially retained along the hub shell by an end cover.

4. The multi-speed hub of claim 3, wherein bearings disposed between the hub shell and the hub shaft are positioned on the hub shaft by a bearing cone.

5. The multi-speed hub of claim 4, wherein one end of the hub shaft is covered by the end cover and the other end of the hub shaft is covered by the bicycle frame.

6. The multi-speed hub of claim 5, wherein the end cover axially positions the spoke shell against the driven gear.

7. The multi-speed hub of claim 6, wherein the spoke shell includes a brake mounting flange for receiving a brake device.

8. The multi-speed hub of claim 7, wherein the brake device is one of a brake disc and a brake drum.

9. The multi-speed hub of claim 7, wherein the spoke shell includes a plurality of spoke mounting flanges each having at least one spoke opening for receiving a spoke.

10. The multi-speed hub of claim 9, wherein the hub shell includes bearing seats on an outer contour of the hub shell for receiving roller bearings and a fastening flange for cantilever mounting the hub shell to the bicycle frame.

11. The multi-speed hub of claim 10, wherein the fastening flange is disposed on the outer contour of the hub shell.

12. The multi-speed hub of claim 11, wherein the driven gear includes an inner contour for engaging a ratchet mechanism and an outer contour for engaging a driven contour of the spoke shell to transfer torque.

13. The multi-speed hub of claim 12, wherein the spoke shell is configured to supportively receive the roller bearings such that when the spoke shell is removed from the hub shell, the roller bearings remain on the spoke shell.

14. The multi-speed hub of claim 1, wherein the driver, the driven gear and the spoke shell are axially retained along the hub shell by an end cover.

15. The multi-speed hub of claim 1 wherein one end of the hub shaft is covered by an end cover and the other end of the hub shaft is covered by the bicycle frame.

16. The multi-speed hub of claim 1, wherein the spoke shell includes a brake mounting flange for receiving a brake device.

17. The multi-speed hub of claim 1, wherein the hub shell includes bearing seats on an outer contour of the hub shell for receiving roller bearings and a fastening flange for cantilever mounting the hub shell to the bicycle frame.

18. The multi-speed hub of claim 1, wherein the driven gear includes an inner contour for engaging a ratchet mechanism and an outer contour for engaging a driven contour of the spoke shell to transfer torque.

19. A multi-speed hub for cantilever mounting to a bicycle frame, the multi-speed hub comprising:
   planetary gear means providing a plurality of transmission paths;
   a hub shaft fixed to the bicycle frame;
   hub shell means configured to enclose the planetary gear mechanism and the hub shaft, the hub shell cantilever-mounted to the bicycle frame; and
   spoke shell means, driver means and driven gear means rotatably supported by the hub shell means,
   one end of the hub shaft indirectly supported by the hub shell means and the other end of the hub shaft fixed to the bicycle frame.

20. The multi-speed hub of claim 19, wherein the driven gear means transfers torque from the planetary gear means to the spoke shell means, the driven gear means rotatable relative to the hub shell means and the hub shaft.

* * * * *